(12) United States Patent
Belair (10) Patent No.: US 10,640,248 B2
(45) Date of Patent: May 5, 2020

(54) WEIGHING MACHINE FOR PRODUCTS IN A PACKAGING ASSEMBLY

(71) Applicant: Luc Belair, Drummondville (CA)

(72) Inventor: Luc Belair, Drummondville (CA)

( * ) Notice: Subject to any disclaimer, the term of this patent is extended or adjusted under 35 U.S.C. 154(b) by 0 days.

(21) Appl. No.: 15/613,140

(22) Filed: Jun. 3, 2017

(65) Prior Publication Data

US 2018/0348047 A1 Dec. 6, 2018

(51) Int. Cl.
*B65B 37/18* (2006.01)
*G01G 19/393* (2006.01)
*B65B 1/34* (2006.01)

(52) U.S. Cl.
CPC .......... *B65B 37/18* (2013.01); *G01G 19/393* (2013.01); *B65B 1/34* (2013.01)

(58) Field of Classification Search
CPC ...................................................... G01G 13/18
See application file for complete search history.

(56) References Cited

U.S. PATENT DOCUMENTS

| | | | |
|---|---|---|---|
| 446,266 A | 2/1891 | Ostenberg | |
| 1,292,178 A | 1/1919 | Waterman | |
| 2,334,384 A | 11/1943 | Cohen | |
| 2,705,607 A * | 4/1955 | Inglett | B65B 1/04 141/10 |
| 3,108,647 A | 10/1963 | Harmon et al. | |
| 3,117,639 A * | 1/1964 | Dreeben | B65B 1/34 177/115 |
| 3,416,708 A * | 12/1968 | Davis | G01G 13/246 222/368 |
| 3,358,014 A | 8/1971 | Richter | |
| 3,786,844 A * | 1/1974 | Smearsoll | B65B 1/32 141/8 |
| 3,842,569 A | 10/1974 | McClelland et al. | |
| 3,944,054 A | 3/1976 | Ensinger | |
| 4,244,461 A | 1/1981 | Fischer et al. | |
| 4,398,612 A | 8/1983 | Mikami et al. | |
| 4,602,709 A | 7/1986 | Ueda | |
| 5,331,792 A | 7/1994 | Kitchen | |
| 5,692,593 A | 12/1997 | Ueno et al. | |
| 5,909,796 A | 6/1999 | Soldavini | |
| 6,227,377 B1 | 5/2001 | Bonnet | |
| 6,605,785 B1 | 8/2003 | Muramiya | |
| 6,625,961 B1 * | 9/2003 | Ogier | B65B 5/101 141/144 |

(Continued)

FOREIGN PATENT DOCUMENTS

GB 872322 A * 7/1961 ............. G01G 13/00

*Primary Examiner* — Charlie Y Peng (57) ABSTRACT

A weighing machine for products in a packaging assembly comprising a vibrating convex disc; a plurality of vibrating trays, a plurality of feeding hoppers, a plurality of weighing hoppers, and a plurality of chutes arranged in a circular pattern; each of the plurality of feeding hoppers comprising a cantilevered flap configured to rotate around a horizontal pivot axis, a counterweight member extending opposite the cantilevered flap, the counterweight member including a plate member configured to slide along at least one groove in relation to the horizontal pivot axis to adjust an effective weight of the counterweight member; a pair of alternating horizontal sliding conveyors; and a pair of transport conveyors positioned under the pair of alternating horizontal sliding conveyors.

8 Claims, 5 Drawing Sheets

(56) References Cited

U.S. PATENT DOCUMENTS

| | | | |
|---|---|---|---|
| 6,976,573 B2 | 12/2005 | Brixius et al. | |
| 7,584,834 B2 | 9/2009 | Wood | |
| 2004/0007444 A1* | 1/2004 | Baranowski | G01G 13/24 |
| | | | 198/757 |
| 2004/0011568 A1 | 1/2004 | Brogi et al. | |
| 2005/0283273 A1* | 12/2005 | Keras | G06F 7/00 |
| | | | 700/239 |
| 2006/0064946 A1 | 3/2006 | Evangeliste | |
| 2010/0012394 A1* | 1/2010 | Kawanishi | G01G 19/393 |
| | | | 177/25.18 |
| 2012/0103753 A1* | 5/2012 | Taylor | G01G 19/393 |
| | | | 193/2 R |
| 2016/0016204 A1 | 1/2016 | Schwarbauer et al. | |
| 2016/0231164 A1* | 8/2016 | Debus | G01G 13/003 |
| 2017/0023399 A1* | 1/2017 | Morimoto | G01G 13/024 |

* cited by examiner

PRIOR ART

WEIGHING MACHINE FOR PRODUCTS IN A PACKAGING ASSEMBLY

CROSS-REFERENCE TO RELATED APPLICATIONS

N/A

BACKGROUND OF THE INVENTION

1. Field of the Invention

The present invention generally relates to weighing machines, but more particularly to an improved weighing machine for products in a packaging assembly.

2. Description of Related Art

One application of a weighing machine is in the packaging industry to ensure that each package in an assembly line has the same desired weight. Since the speed and handling treatment of products are important in an assembly line, many improvements have been made to the process. Applicant has patented such a machine which is described in Chinese patent 201610860931.8, the disclosure of which is incorporated herein by reference.

Although applicant's machine showed significant improvements over the prior art, most notably for its delicate handling of fragile content such as fruits and vegetables, there is still room for improvement. The major problem appears to be in the vertical drop that the fragile contents are subject to as they go through the machine. If the vertical drop is too high, the fragile contents are damaged when it hits a surface lying below. Consequently, there is a need for an improved weighing machine with an improved handling of fragile contents in a packing assembly.

BRIEF SUMMARY OF THE INVENTION

In one embodiment of the present invention a weighing machine for products in a packaging assembly is provided, comprising a vibrating convex disc; a plurality of vibrating trays, a plurality of feeding hoppers, a plurality of weighing hoppers, and a plurality of chutes all arranged in a circular pattern; each of the plurality of feeding hoppers comprising a cantilevered flap configured to rotate around a horizontal pivot axis, a counterweight member extending opposite the cantilevered flap, the counterweight member including a plate member configured to slide along at least one groove in relation to the horizontal pivot axis to adjust an effective weight of the counterweight member, a pair of alternating horizontal sliding conveyors; and a pair of transport conveyors positioned under the pair of alternating horizontal sliding conveyors.

In one embodiment, each of the plurality of feeding hoppers further comprise a first gate member, a second gate member, and a gate opening mechanism. In one embodiment, the gate opening mechanism includes an M-shaped articulated hinge member connected to the first and second gate members such that when the first gate member opens it simultaneously opens the second gate member. In another embodiment, the gate opening mechanism is a pneumatic system. In one embodiment, the products are configured to stay on the cantilevered flap during operation until a predetermined weight is reached which exceeds the effective weight of the counterweight member. In yet another embodiment, the cantilevered flap flips down and presses against the first gate member waiting the activation of the gate opening mechanism which opens the first and second gate members allowing the products to pass through the first and second gate members. In one embodiment, the plurality of weighing hoppers include a bottom surface positioned close to a top portion of the pair of alternating horizontal sliding conveyors defining a fall height, such that when the products fall from the plurality of weighing hoppers to one of the pair of alternating horizontal sliding conveyors the damage is limited.

In another embodiment, each of the pair of alternating horizontal sliding conveyors are configured to alternate positions such that only one of the pair of transport conveyors is exposed underneath the pair of alternating horizontal sliding conveyors. In one embodiment, each of the pair of transport conveyors are configured to operate in two directions such that each of the transport conveyors can bring the products to any side of the weighing machine enabling a plurality of integration machines to be connected in the package assembly.

In one embodiment, the plurality of feeding hoppers are positioned below the plurality of vibrating trays, the plurality of weighing hoppers are positioned below the plurality of feeding hoppers, the plurality of chutes are positioned below the plurality of weighing hoppers, and the pair of alternating horizontal sliding conveyors are positioned below the plurality of chutes. In another embodiment, the pair of alternating horizontal sliding conveyors and the pair of transport conveyors are comprised of a rubberized material reducing impact fall damage to the products.

In another aspect of the invention, a weighing machine for products in a packaging assembly is provided, comprising a base; a centralized cone supported in a frame; a vibrating convex disc; a plurality of vibrating trays, a plurality of feeding hoppers, a plurality of weighing hoppers, and a plurality of chutes arranged in a circular pattern; each of the plurality of feeding hoppers comprising a cantilevered flap configured to rotate around a horizontal pivot axis, a counterweight member extending opposite the cantilevered flap, the counterweight member including a plate member configured to slide along at least one groove in relation to the horizontal pivot axis to adjust an effective weight of the counterweight member, wherein the products are configured to stay on the cantilevered flap during operation until a predetermined weight is reached which exceeds the effective weight of the counterweight member a pair of alternating horizontal sliding conveyors; and a pair of transport conveyors positioned under the pair of alternating horizontal sliding conveyors, wherein each of the pair of alternating horizontal sliding conveyors are configured to alternate positions such that only one of the pair of transport conveyors is exposed underneath the pair of alternating horizontal sliding conveyors, wherein the pair of alternating horizontal sliding conveyors and the pair of transport conveyors are comprised of a rubberized material reducing impact fall damage to the products.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide an improved weighing machine for products in a packaging assembly with an improved handling of fragile contents.

Figure 1:
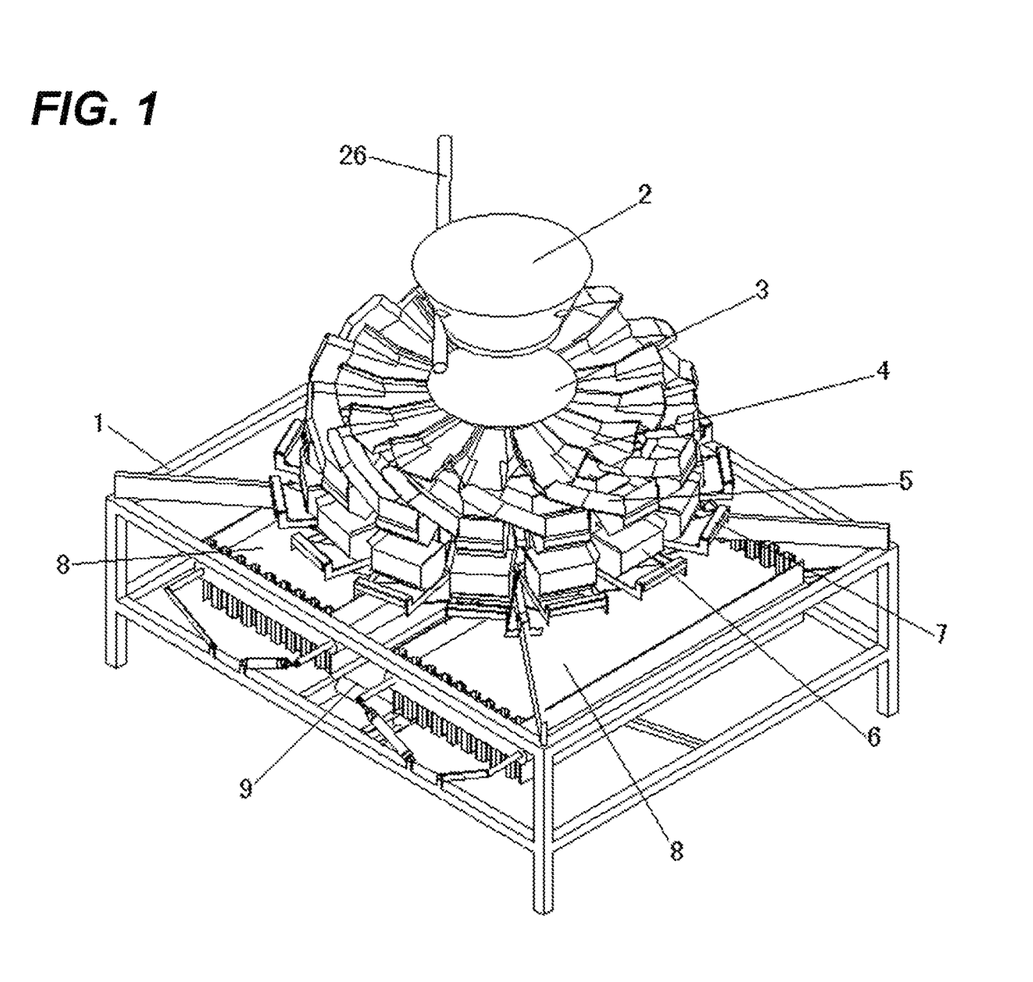
FIG. 1 is a perspective view of a weighing machine of the prior art.

FIG. 1 is a perspective view of a weighing machine of the prior art. The weighing machine comprises a center fixed cone 2 fixed on an upper end of a frame through a supporting rod 26. A central vibrating cone 3 is arranged on a lower side of the center fixed cone. Linear vibrating trays 4 are evenly disposed under the central vibrating cone 3 on one end and at the top of sliding feeding chutes 5 at their opposite ends. The bottom of the sliding feeding chutes consists in an automatic door mechanism to feed weighing hoppers 6 underneath. The lower end of the weighing hoppers 6 arranged symmetrically and feeding a lower receiving conveyors 9, wherein two receiving conveyor 8 are arranged under deflecting plates 7.

Figure 2:
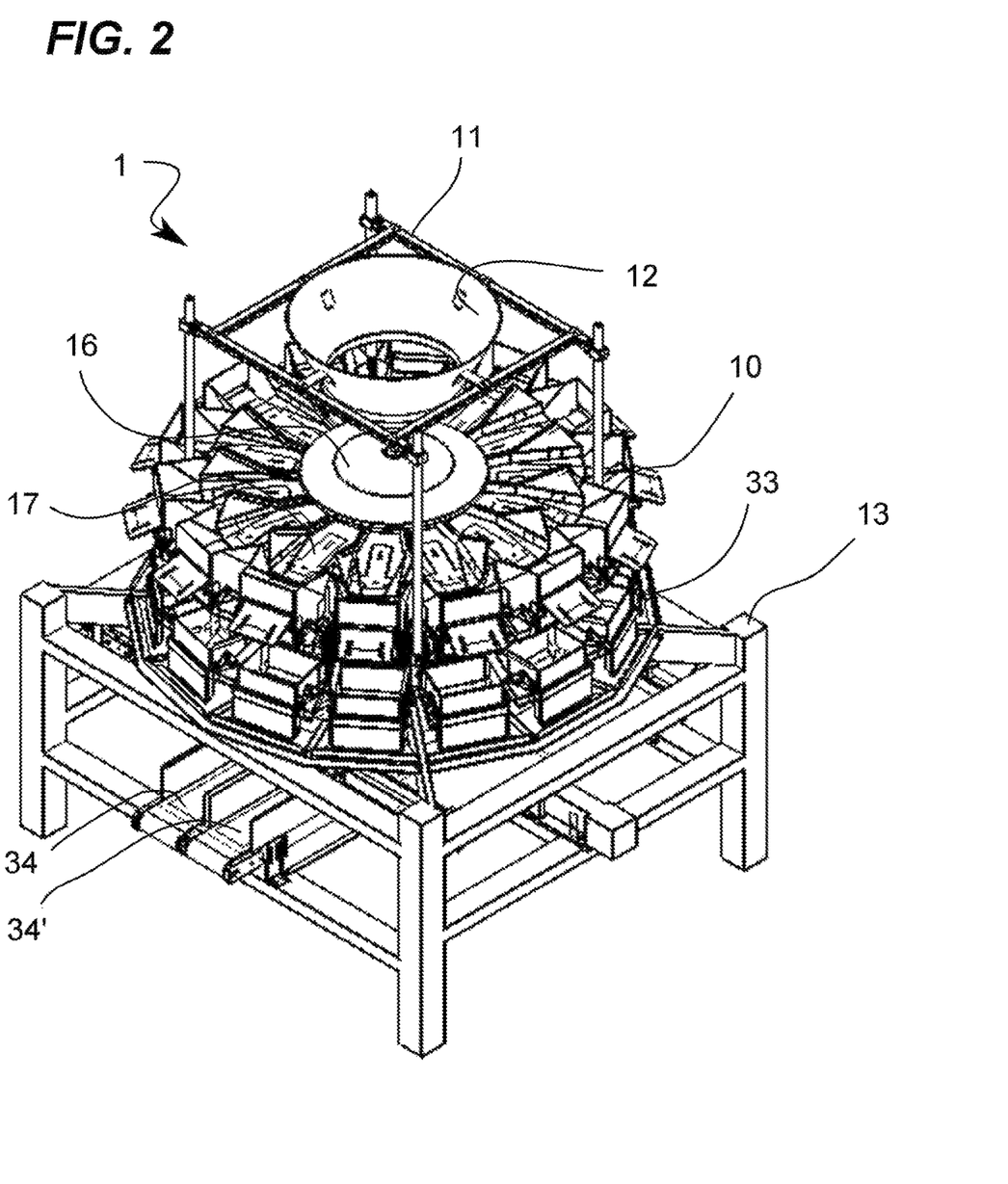
FIG. 2 is a perspective view of an improved weighing machine for products in a packaging assembly according to an embodiment of the present invention.

FIG. 2 is a perspective view of an improved weighing machine 1 for products in a packaging assembly according to an embodiment of the present invention. The improved weighing machine 1 comprises a plurality of soft landing feeding hoppers 10 configured in a circular pattern surrounding a vibrating convex disc 16 and a centralized cone 12 positioned and supported in frame 11. The improved weighing machine 1 further comprising a plurality of vibrating trays 17 and a plurality weighing hoppers 33 both configured in a circular pattern. A pair of transport conveyors 34/34' is also provided, and will be discussed in greater detail below. The aforementioned components supported on base 13.

It is a particular advantage of the present invention to not require the sliding feeding chutes 5 (FIG. 1), but rather during operation, fragile products intended to be packaged are passed directly from the vibrating convex disc onto the plurality of vibrating trays and then to the soft landing feeding hoppers. The details of the operation will be discussed in greater detail below.

Figure 5:
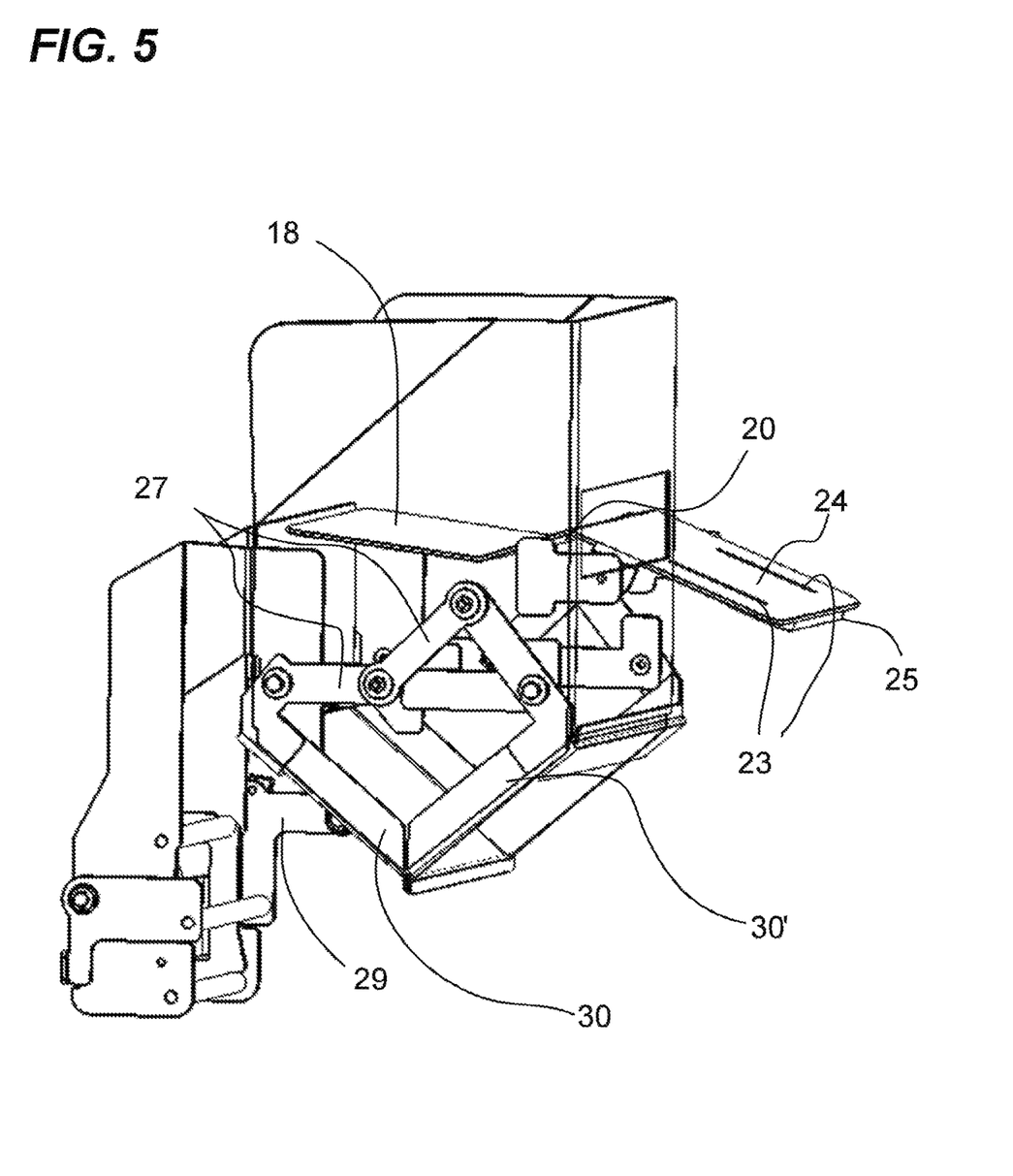
FIG. 5 is a detailed perspective view of a soft landing feeding hopper of the improved weighing machine according to an embodiment of the present invention.

FIGS. 3A-E are side views of a soft landing feeding hopper of the improved weighing machine 1 during operation and FIG. 5 is a perspective view of a soft landing feeding hopper. Referring now to FIGS. 3A-E and FIG. 5, a soft landing feeding hopper of the plurality of soft landing feeding hoppers is illustrated. The soft landing feeding hopper comprises a cantilevered flap member 18 configured to rotate around a horizontal pivot axis 20 when the weight of products 22 placed the cantilevered flap member exceeds the effective weight of a counterweight member 24. The counterweight member extends opposite the cantilevered flap member. In one embodiment, the counterweight member includes a plate member 25 configured to slide along at least one groove 23. The counterweight member may be adjusted by sliding the plate member along the grooves closer or further from the horizontal pivot axis depending on the desired effective weight of the counterweight member. The plate may be constructed from a variety of materials, depending on weight requirements. In one embodiment, the plate is interchangeable, such that the plate may be interchanged to a heavier or lighter plate depending on weight requirements.

Figure 3A:
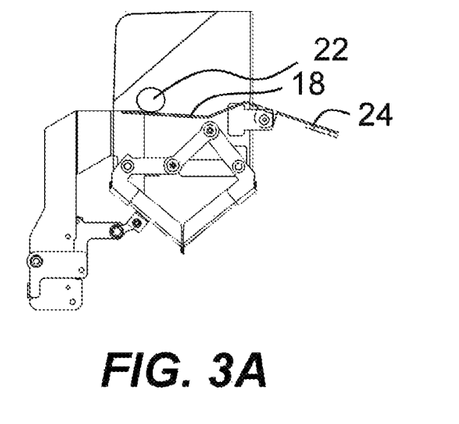
FIGS. 3A-E are side views of a soft landing feeding hopper of the improved weighing during operation according to an embodiment of the present invention.
Figure 3B:
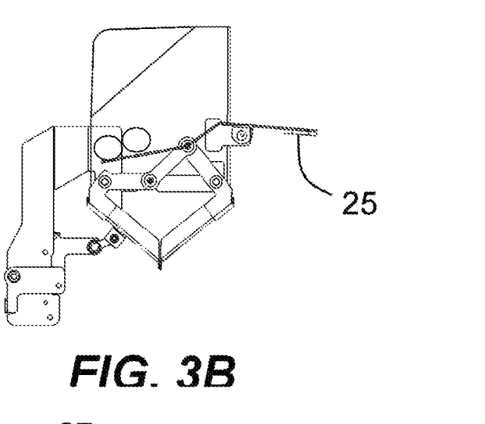
Figure 3C:
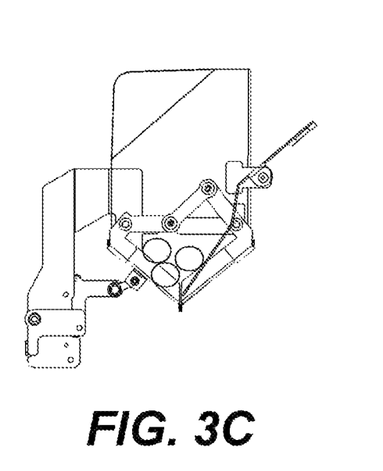
Figure 3D:
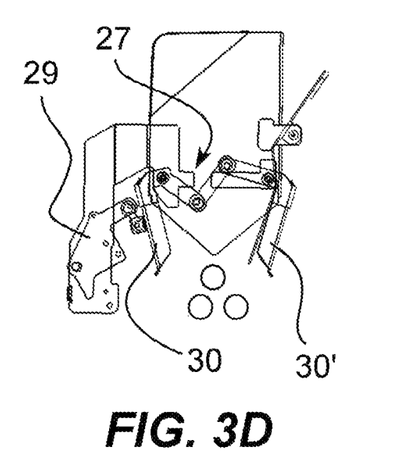
Figure 3E:
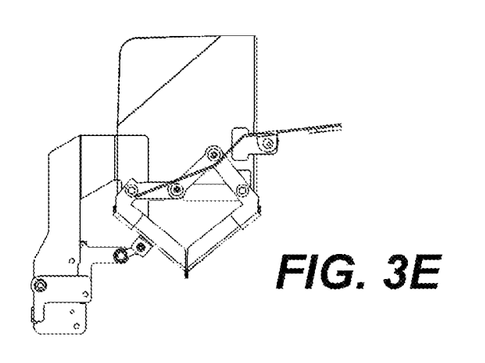

Referring now to FIG. 3A, during operation products 22 are placed on cantilevered flap member 18 as illustrated. However, it should be understood, that the products stay on the cantilevered flap until a predetermined weight is reached which exceeds the effective weight of counterweight member 34 as previously discussed. Referring now to FIGS. 3B-C, when there is sufficient weight of products, the cantilevered flap flips down and presses against a first gate member 30. Referring now to FIG. 3D, once the cantilevered flap flips down and presses against the first gate member. As known in the art, when a weighing mechanism (not shown) needs to feed one of the weighing hoppers 33, a gate opening mechanism 29 opens the first gate member and a second gate member 30' allowing the products to pass through the first and second gate members as illustrated. In one embodiment, the gate opening mechanism includes an articulated hinge member 27 having an "M" shape. The articulated hinge member is connected to the first and second gate members in such a way that when the first gate member opens it simultaneously opens the second gate member. In one embodiment, the gate opening mechanism is a pneumatic driven system.

Figure 4A:
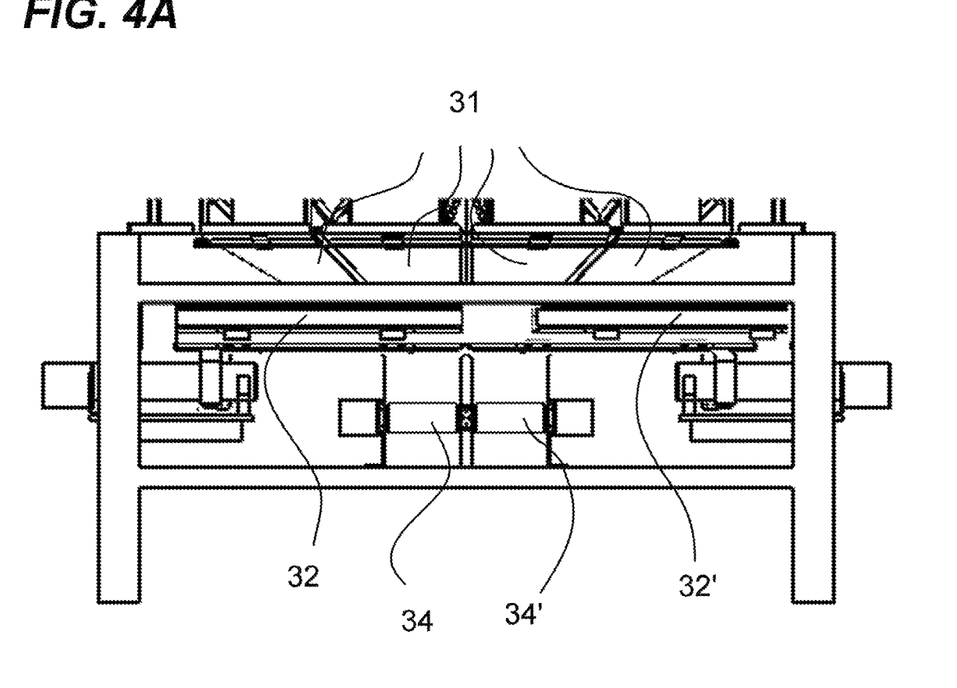
FIGS. 4A-B are side views of an operation of a pair of alternating horizontal sliding conveyors of the improved weighing machine according to an embodiment of the present invention.
Figure 4B:
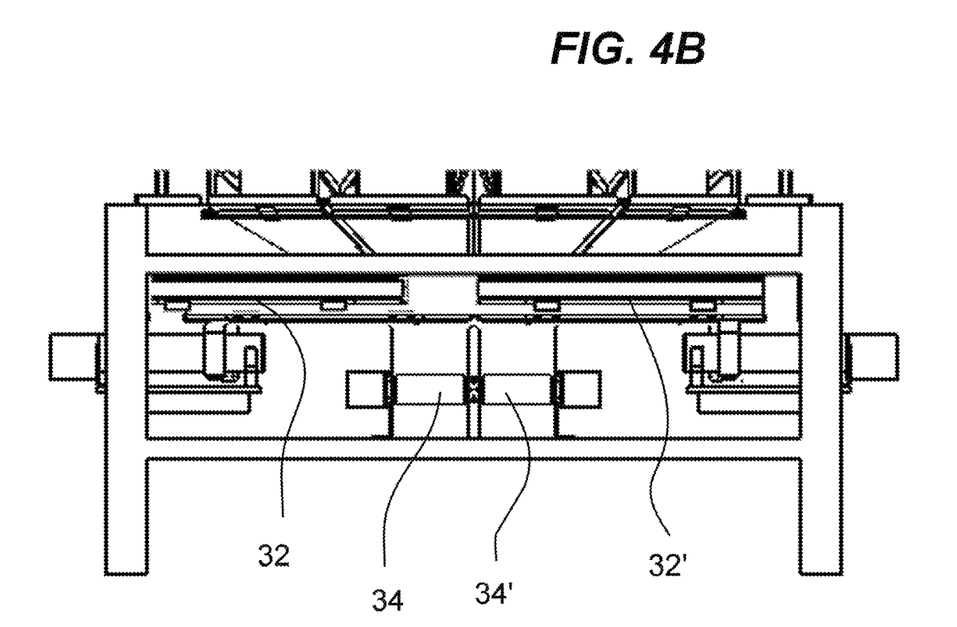

FIGS. 4A-B are side views of an operation of a pair of alternating horizontal sliding conveyors of the improved weighing machine 1 according to an embodiment of the present invention. Regarding, FIG. 2 and FIGS. 4A-E, once the products pass through the first and second gate members they exit the soft landing feeding hopper the products go through a weighing hopper of the plurality of weight hoppers, roll off a chute of a plurality of chutes 31, then drop onto a pair of alternating horizontal sliding conveyors 32/32'. It is a particular advantage of the present invention, that the bottom portion of the weighing hoppers are close to the top portion of the alternating horizontal sliding conveyors, further limiting the height at which the products fall to prevent damage. In one embodiment, the pair of alternating horizontal sliding conveyors is comprised of a rubberized surface further reducing the potential damage to the products. In one embodiment, the pair of transport conveyors is also comprised of a rubberized surface. The weighing hoppers weigh the product, as well known in the art.

The plurality of chutes is aligned in a circular pattern, similarly to the plurality of hoppers and the plurality of weighing hoppers (best seen in FIG. 2). Due to this circular design, after the products go through the weighing hoppers, the products are located towards an inside portion of the circular pattern. Then when the products drop onto the alternating horizontal sliding conveyors, the products are transported towards the center of the circular pattern, where the products then fall onto one of the pair of transport conveyors 34/34'. It is a particular advantage of the present invention that the alternating sliding conveyors limit the fall the products are subject to during operation. Further, the alternating horizontal sliding conveyors speed up the process of transporting the products. For instance, as seen in FIG. 4A, conveyor 32' is currently positioned sideways such that transport conveyor 34' is exposed. Thus, when the products are coming from both alternating horizontal sliding conveyors 32/32', the products will fall onto transport conveyor 34'. Alternatively, as seen in FIG. 4B, conveyor 32 is currently positioned sideways such that transport conveyor 34 is exposed. Thus, when the products are coming from both pair of alternating horizontal sliding conveyors 32/32', the products will fall onto transport conveyor 34. The transport conveyors are able to operate in both directions, so each of the transport conveyors can bring the products to the sides of the complete system, enabling two or four integration machines to be connection which handle the next phase in the packing process. The other phases of the packing process and/or assembly are considered outside of the scope of the invention and will not be discussed herein.

Another particular inventive aspect of the invention is that the distances between the alternating horizontal sliding conveyors and the transport conveyors are adjustable to accommodate various product sizes and loads, thus limiting impact falls the products are subject to during operation. This feature, combined with the rubberized surface of the conveyors greatly limit potential damage to the products during operation.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention. For instance, in alternative embodiments the gate opening mechanism may be an electrical system or a hydraulic driven system.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A weighing machine for products in a packaging assembly comprising:
    a vibrating convex disc;
    a plurality of vibrating trays, a plurality of feeding hoppers, a plurality of weighing hoppers, and a plurality of chutes arranged in a circular pattern; each of the plurality of feeding hoppers comprising a cantilevered flap configured to rotate around a horizontal pivot axis, a counterweight member extending opposite the cantilevered flap, the counterweight member including a plate member configured to slide along at least one groove in relation to the horizontal pivot axis to adjust an effective weight of the counterweight member;
    a pair of alternating horizontal sliding conveyors; and
    a pair of transport conveyors positioned under the pair of alternating horizontal sliding conveyors.

2. The weighing machine of claim 1, wherein the products are configured to stay on the cantilevered flap during operation until a predetermined weight is reached which exceeds the effective weight of the counterweight member.

3. The weighing machine of claim 1, wherein the plurality of weighing hoppers, arranged in a circular pattern, include a bottom surface positioned close to a top portion of the pair of alternating horizontal sliding conveyors defining a fall height, such that when the products fall from the plurality of weighing hoppers to one of the pair of alternating horizontal sliding conveyors the damage is limited.

4. The weighing machine of claim 1, wherein each of the pair of alternating horizontal sliding conveyors are configured to alternate positions such that only one of the pair of transport conveyors is exposed underneath the pair of alternating horizontal sliding conveyors.

5. The weighing machine of claim 1, wherein each of the pair of transport conveyors are configured to operate in two directions such that each of the transport conveyors can bring the products to any side of the weighing machine enabling a plurality of integration machines to be connected in the package assembly.

6. The weighing machine of claim 1, wherein the plurality of feeding hoppers are positioned below the plurality of vibrating trays, the plurality of weighing hoppers are positioned below the plurality of feeding hoppers, the plurality of chutes are positioned below the plurality of weighing hoppers, and the pair of alternating horizontal sliding conveyors are positioned below the plurality of chutes.

7. The weighing machine of claim 1, wherein the pair of alternating horizontal sliding conveyors and the pair of transport conveyors are comprised of a rubberized material reducing impact fall damage to the products.

8. A weighing machine for products in a packaging assembly comprising:
    a base;
    a centralized cone supported in a frame;
    a vibrating convex disc;
    a plurality of vibrating trays, a plurality of feeding hoppers, a plurality of weighing hoppers, and a plurality of chutes arranged in a circular pattern; each of the plurality of feeding hoppers comprising a cantilevered flap configured to rotate around a horizontal pivot axis, a counterweight member extending opposite the cantilevered flap, the counterweight member including a plate member configured to slide along at least one groove in relation to the horizontal pivot axis to adjust an effective weight of the counterweight member, wherein the products are configured to stay on the cantilevered flap during operation until a predetermined weight is reached which exceeds the effective weight of the counterweight member
    a pair of alternating horizontal sliding conveyors; and
    a pair of transport conveyors positioned under the pair of alternating horizontal sliding conveyors, wherein each of the pair of alternating horizontal sliding conveyors are configured to alternate positions such that only one of the pair of transport conveyors is exposed underneath the pair of alternating horizontal sliding conveyors, wherein the pair of alternating horizontal sliding conveyors and the pair of transport conveyors are comprised of a rubberized material reducing impact fall damage to the products.

* * * * *